United States Patent [19]

Barlier et al.

[11] Patent Number: 4,687,751

[45] Date of Patent: Aug. 18, 1987

[54] OPAL GLASS EXHIBITING A CREAMY-WHITE TINT

[75] Inventors: Pernette R. M. Barlier, Vulaines sur Seine; Jean-Pierre Mazeau, Samoreau, both of France

[73] Assignee: Corning Glass Works, Corning, N.Y.

[21] Appl. No.: 836,767

[22] Filed: Mar. 6, 1986

[30] Foreign Application Priority Data

Aug. 30, 1985 [FR] France ................ 85 12923

[51] Int. Cl.⁴ ............... C03C 14/00; C03C 3/112; C03C 3/118
[52] U.S. Cl. ..................... 501/32; 501/57; 501/59
[58] Field of Search ............. 501/32, 57, 59

[56] References Cited

U.S. PATENT DOCUMENTS

| | | | |
|---|---|---|---|
| 1,292,147 | 1/1919 | Taylor | 501/65 |
| 2,321,987 | 6/1943 | Brown | 501/31 |
| 2,683,666 | 7/1954 | Duncan et al. | 501/57 |
| 2,965,503 | 12/1960 | Hagedorn et al. | 501/71 |
| 3,673,049 | 6/1972 | Giffen et al. | 501/64 |
| 4,311,529 | 1/1982 | Danielson et al. | 501/64 |
| 4,532,223 | 7/1985 | Barlier et al. | 501/32 |

*Primary Examiner*—Mark L. Bell
*Attorney, Agent, or Firm*—C. S. Janes, Jr.

[57] ABSTRACT

This invention relates to the production of opal glasses having a creamy-white tint which are suitable for forming culinary articles. The opacity is obtained through precipitation of fluorides, preferably NaF. The creamy-white tint results from the association of $Fe_2O_3$ with $TiO_2$ and/or $As_2O_3$ and/or $CeO_2$, with the addition of nitrates. The preferred composition of the final glass consists essentially, in weight percent, of:

| | | | |
|---|---|---|---|
| $SiO_2$ | 70–73 | $Fe_2O_3$ | 0.1–0.25 |
| $Na_2O$ | 10.5–13 | $TiO_2$ | 0.1–0.7 |
| Fluorine | 4–5.5 | $As_2O_3$ | 0.05–0.4 |
| $Al_2O_3$ | 6–9 | $CeO_2$ | 0–0.2 |
| CaO | 0.2–1.7 | $B_2O_3$ | 0.5–3 |
| BaO | 1–3 | | |

The starting composition contains $NaNO_3$ in a proportion of 0.2–2 by weight, counted as $Na_2O$ with regard to the glass, or an equivalent quantity of another alkali metal or alkaline earth metal nitrate.

7 Claims, No Drawings

OPAL GLASS EXHIBITING A CREAMY-WHITE TINT

BACKGROUND OF THE INVENTION

The objective of the present invention is to provide compositions of dense opal glasses having a "cream white" color which can be used in the manufacture of culinary articles (tableware and ovenware).

As described in U.S. Pat. No. 4,532,223, the purchase of such articles depends, in large measure, upon the aesthetic appearance thereof which is the result, in a general way, of a combination of several elements: the appearance of the opal glass comprising the article; the decoration applied to the material; and the shape of the article. With respect to opal glass, it appears that a "creamy-white" tint similar to that of certain porcelain articles (for example, "Wedgewood Bone China") is particularly desirable.

The objective of this invention is to produce those types of dense, tinted opal glasses. The opalization of those glasses is the result of the precipitation, during the course of cooling the molten glass to a glass body (with or without subsequent heat treatments), of crystal phases of alkali metal and alkaline earth metal fluorides. The principal crystal phase is NaF. One understands that "dense opal glass" means a glass whose opalization, determined through a measure of its opacity, is very considerable.

U.S. Pat. No. 4,532,223 emphasized the difficulty of obtaining a "creamy white" tint in NaF-based opal glasses and provided a new solution consisting of utilizing sulfide ions in the presence of ferric ions as a coloration system. That solution satisfies very well the objective of obtaining the desired tint. However, that system can lead to several difficulties when applied to large scale production. Hence, the tint is sensitive to oxidation/reduction conditions and the glass quality is sometime affected by the presence of gaseous inclusions due to the phenomenon known as "reboil." Whereas they can generally be controlled by observing strict production conditions, those difficulties justify research for a new coloration system for use on an industrial scale.

The goal of the present invention is to provide a system of colorants which would permit, on the one hand, the desired tint to be obtained and, on the other hand, significantly reduce, even eliminate, the previously mentioned difficulties. It must be emphasized that the tint of the opal glass depends not only on the "colorants," but also on the degree of opacity. If this degree of opacity depends upon the cooling rate of the material (in the course of shaping the glass articles, for example, from the molten glass) and any possible heat treatments applied thereto, the degree of opacity is also determined to a critical extent by the nature of the chemical composition of the glass.

It has been proposed to obtain opal glasses by utilizing a combination of $Fe_2O_3$ and $TiO_2$, but the example provided report a large content of CaO and ZnO, thereby raising doubts that they exhibited very great opacity.

SUMMARY OF THE INVENTION

The present invention provides a composition for obtaining a NaF opal glass, this composition containing addition elements designed to confer upon the glass a creamy-white tint, characterized in that the aforesaid addition elements consist essentially, in weight percent of the resulting glass:

| | |
|---|---|
| $Fe_2O_3$ | 0.05–0.3 |
| $TiO_2$ | 0.1–1 |
| and/or | |
| $As_2O_3$ | 0.05–0.5 |
| and/or | |
| $CeO_2$ | 0.05–0.5 |
| and | |
| $NaNO_3$ in a proportion of 0.2–2, counted as $Na_2O$ with regard to the glass, or an equivalent quantity of another alkali metal or alkaline earth metal nitrate. | |

The composition according to the invention preferably corresponds to a base glass consisting essentially, expressed in terms of weight percent on the oxide basis, of:

| | | | |
|---|---|---|---|
| $SiO_2$ | 70–73 | CaO | 0.2–1.7 |
| $Na_2O$ | 10.5–13 | $Al_2O_3$ | 6–9 |
| F | 4–5.5 | BaO | 1–3 |

Because fluorine can be combined with more than one cation, it is merely reported as fluoride, in accordance with conventional glass analysis practice.

Advantageously, the glass will contain:

| | |
|---|---|
| F | 4.2–5.2 |
| $Fe_2O_3$ | 0.1–0.25 |
| $TiO_2$ | 0.1–0.7 |
| $As_2O_3$ | 0.05–0.4 |
| $CeO_2$ | no more than 0.2 |

It is preferred that the glass contain 0.5–3% $B_2O_3$, 0–1.5% ZnO, and be essentially free of $K_2O$ and $Li_2O$.

The composition should be maintained within the defined limits in order to obtain an opaque material ("dense opal") providing all of the characteristics necessary for applications such as tableware or ovenware (chemical durability is generally required). On the other hand, the composition limits also take into account the constraints tied to production (melting, forming, possible heat treatments).

The NaF opal system was chosen because it offers a good compromise between the properties required for applications for which the glasses will be used, compatibility with conventional production processes, and cost. As a consequence of choosing NaF as the opacifying phase, the minimum quantities of $Na_2O$ and F are critical for the development of good opacity. To significantly increase those elements beyond the indicated limits would appreciably alter the chemical durability and manufacturing conditions. CaO also participates in the opacity by reason of the precipitation of a minor quantity of $CaF_2$; however, its content will be limited to about 1.7% so that the chemical durability will not deteriorate. For the same reason, $Al_2O_3$ is maintained above about 6%. Like $Al_2O_3$, BaO is necessary for chemical resistance but both have the disadvantage of reducing opacity when present in excessive amounts; the concentration of each will be limited to about 9% and 3%, respectively.

The presence of $B_2O_3$ is not essential but the glass will preferably contain at least 0.5% in order to obtain working temperatures (melting, forming) compatible with conventional equipment. The maximum content of 3% is essentially fixed by the reduction of opacity. ZnO may optionally be introduced without a major change in properties (it can improve the chemical durability). When the relatively high costs of ZnO is taken into account, the preferred glasses will not contain any.

The glass may, without inconvenience, contain up to 1.5% $Li_2O$ or up to 2.5% $K_2O$, but those oxides do not provide a decisive advantage so it is preferred that they be absent.

$SiO_2$ is the principal glass forming oxide; the amount thereof is fixed by difference with the sum of the other elements. However, a value less than about 70% would hazard the deformation of shaped glass articles during possible heat treatments (the firing of decorations thereon, for example).

The base composition alone leads to a white opal glass. The "cream" coloration is, as mentioned previously, obtained through a combination of $Fe_2O_3$ in the presence of $TiO_2$ and/or $As_2O_3$. $Fe_2O_3$ introduced alone leads to a greenish opal glass which is unacceptable for the application considered. $TiO_2$ alone up to about 1% does not sufficiently color the material, but a $TiO_2$ content greater than 1% is detrimental to opacity. However, we have found that the simultaneous presence of $Fe_2O_3$ and $TiO_2$ permits the desired color to be obtained. Below 0.05% $Fe_2O_3$ the color is too light and especially is this so when $TiO_2$ is less than 1%. With low contents of $TiO_2$ (less than about 0.2%) and in the absense of $As_2O_3$, the glass exhibits an unacceptable greenish appearance. For the same reason, one also avoids combining a large amount of $Fe_2O_3$ with an amount of $TiO_2$ less than about 0.5%. On the other hand, the simultaneous presence of a maximum amount of $Fe_2O_3$ and $TiO_2$ would lead to an opal glass colored too much. Consequently, it will be understood that concentrations of $Fe_2O_3$ and $TiO_2$ will be chosen from between the indicated limits therefore in order to obtain the desired appearance. The coloration produced through the simultaneous presence of $Fe_2O_3$ and $TiO_2$ results from the formation of a $Fe^{+2}$—O—$Ti^{+4}$ type group.

In the presence of $As_2O_3$, which effects the oxidation of $Fe^{+2}$ to $FE^{+3}$ and, as a consequence, reduces the greenish appearance of the coloration, the use of $TiO_2$ is not essential in order to obtain an attractive tint. However, because $TiO_2$ in the presence of $As_2O_3$ slightly displaces the color toward a more dominant yellow (the diffused reflection decreases), and since it is supposed to play a role in the stabilization of the color (utilization of the $Fe^{+2}$ ions formed due to variations of oxidation/reduction conditions), it is preferred that the glass contains a small quantity. $As_2O_3$ will preferably be present in the glass in an amount greater than 0.05% in order to assure that a stable condition without a greenish appearance is obtained under normal manufacturing conditions.

In the same literature which indicates that the simultaneous presence of $TiO_2$ and $Fe_2O_3$ in transparent glasses leads to a yellow-brown coloration, it is also indicated that the simultaneous presence of $TiO_2$ and $CeO_2$ gives a yellow color. There is, consequently, an advantage in also utilizing $CeO_2$ in our case. In the absence of $As_2O_3$, $CeO_2$ increases the dominant wavelength (displacing it toward the yellow) which improves the "creamy-white" appearance. This also results through the oxidation of $Fe^{+2}$ to $Fe^{+3}$. A $CeO_2$ content above 0.5% is unnecessary for the desired coloration and serves only to raise the cost of the starting materials.

The role of the nitrate, in association with the colorants which were just cited, is to stabilize the states of oxidation and, consequently, to furnish stable and regular tints in industrial manufacturing.

The preferred composition range comprises the best compromise between color, opacity, stability of the tint with respect to melting conditions, and the cost of the vitrifiable mixture.

As described before, the appearance of the material results from the concentrations of the "colorants" and the degree of opacity which, itself, depends upon the composition of the base glass (especially the fluoride content), upon the cooling rate of the molten glass (forming method), and upon possible subsequent heat treatments. The concentration of "colorants" to achieve a chosen tint will be adjusted as a function of those conditions.

PRIOR ART

U.S. Pat. No. 1,292,147 discloses the use of $TiO_2$ alone and a combination of $TiO_2$ and $CeO_2$ to impart color to transparent glasses.

U.S. Pat. No. 2,321,987 also reveals the use of $TiO_2+CeO_2$ to impart a yellow coloration to a transparent glass. $Fe_2O_3$ was present in the glass as an impurity.

U.S. Pat. No. 2,683,666 discusses the production of ivory colored opal glasses containing essentially, in weight percent, of:

| $SiO_2$ | 60–70 | $TiO_2$ | 4–10 |
|---|---|---|---|
| $Na_2O + K_2O$ | 15–20 | $CeO_2$ | 0.75–2.25 |
| CaO | 0.1–5 | $F_2$ | 4–7 |
| $Al_2O_3$ | 0–10 | | |

It is immediately evident that, when compared with the present invention compositions, the alkali metal oxide content, the $TiO_2$ content, and the $CeO_2$ content are all outside of the defined ranges. $Fe_2O_3$ is nowhere mentioned.

U.S. Pat. No. 2,965,503 is concerned with the use of $TiO_2+Fe_2O_3+NiO$ to impart a golden yellow color to transparent glasses.

U.S. Pat. No. 3,673,049 describes fluoride opal glasses consisting essentially of $Na_2O$, $Al_2O_3$, and $SiO_2$, with the optional presence of a wide variety of oxides including alkaline earth oxides, $Fe_2O_3$, $CeO_2$, $TiO_2$, and $As_2O_3$. However, no mention is made of "creamy-white" opal glasses or the critical combination of $Fe_2O_3$, $TiO_2$, and/or $As_2O_3$ and/or $CeO_2$ and the very narrowly-defined amounts thereof necessary to achieve such glasses.

U.S. Pat. No. 4,311,529 claims ivory-colored opal glasses consisting essentially, in weight percent, of:

| $Na_2O$ | 8–9 | NiO | 0.005–0.1 |
|---|---|---|---|
| $K_2O$ | 2–2.5 | $CeO_2$ | 0–2 |
| CaO | 5–6.5 | $TiO_2$ | 0–4 |
| ZnO | 8–10 | $CeO_2 + TiO_2$ | 0.5–6 |
| $B_2O_3$ | 1–2 | $As_2O_3$ | 0–0.5 |
| $Al_2O_3$ | 10–11 | $SiO_2$ | 57–61 |
| F | 3–4 | | |

Quite apparently, the base glass compositions are far removed from the present inventive glasses and $Fe_2O_3$ is nowhere mentioned.

U.S. Pat. No. 4,532,223 refers to opal glasses exhibiting colors ranging from "cream-white" to "beige" having base compositions consiting essentially, in weight percent, of

| | | | |
|---|---|---|---|
| $SiO_2$ | 67–74 | SrO | 0–4 |
| $B_2O_3$ | 0–3 | CaO + BaO + SrO | 0.5–5 |
| $Al_2O_3$ | 6.5–9.5 | ZnO | 0–2.5 |
| $Li_2O$ | 0–1.5 | $TiO_2$ | 0–1 |
| $Na_2O$ | 8.5–13 | $CeO_2$ | 0–0.5 |
| $K_2O$ | 0–2.4 | $MnO_2$ | 0–0.4 |
| $Li_2O + Na_2O + K_2O$ | 8.5–15 | $As_2O_3$ | 0–0.3 |
| CaO | 0.2–3 | $Sb_2O_3$ | 0–0.3 |
| BaO | 0–3.5 | F | 3.5–6 |

Whereas those base compositions unquestionably overlap those of the present inventive glasses, the colorant mechanism therein involved a reaction of iron and sulfur ions, a mechanism different from that of the present glasses.

DESCRIPTION OF PREFERRED EMBODIMENTS

The invention is illustrated through the examples in the accompanying table. The compositions of the glasses are reported in weight percentages as analyzed. The analyses were carried out through the technique of X-ray fluorescence. The reference utilized was established through wet chemical analysis. The $B_2O_3$ concentration given in parentheses is the batch content. The percentage of $SiO_2$ also given in parentheses was calculated, as it usually is with glasses containing a substantial quantity of fluoride, as follows:

% $SiO_2$ = 100 − (sum of the percentages of other oxides + % F − 0.421 × % F)

The color is defined by the trichromatic coordinates (x,y) and the measured diffused reflection Y (%) for Illuminant C with the aid of an "ELREPHO"-type colorimeter. These determinations were made on the rough surface of a sample having a thickness of about 5 mm; a "black tile" being applied to the rear face of the sample. The diffused reflection is also measured with the aid of a "white tile". The difference of diffused reflection (ΔY) between "white tile" and "black tile" provides an evaluation of the opacity (the opacity increases when ΔY decreases). x,y, Y, and ΔY are reported for each glass in the adjoining table.

The batch materials were weighed and mixed together to prepare about 600 grams of glass. They were introduced into a silica crucible and melted at 1400° C. for 5 hours. Plates having a thickness of about 5 mm were formed; reheated for a few minutes between 520°–550° C. to eliminate stresses; and then treated for a few minutes at 660° C. in order to simulate the decorating process.

The preferred tint is exhibited in Example 1.

TABLE

| | 1 | 2 | 3 | 4 | 5 | 6 | 7 |
|---|---|---|---|---|---|---|---|
| $SiO_2$ | (72.15) | (71.93) | (72.29) | (71.44) | (71.58) | (71.38) | (72.22) |
| $B_2O_3$ | (2.00) | (2.00) | (2.00) | (2.00) | (2.00) | (2.00) | (2.00) |
| $Al_2O_3$ | 8.37 | 8.35 | 8.51 | 8.26 | 8.27 | 8.29 | 8.37 |
| $Na_2O$ | 11.09 | 11.18 | 10.92 | 11.18 | 11.21 | 11.07 | 11.25 |
| CaO | 0.77 | 0.77 | 0.76 | 0.78 | 0.75 | 0.77 | 0.75 |
| BaO | 2.23 | 2.24 | 2.21 | 2.26 | 2.21 | 2.19 | 2.23 |
| F | 4.66 | 4.80 | 4.01 | 4.97 | 4.97 | 4.88 | 4.78 |
| $TiO_2$ | 0.27 | 0.27 | 0.53 | 0.75 | 0.75 | 0.98 | 0.02 |
| $CeO_2$ | 0.11 | 0.11 | 0.10 | 0.14 | 0.03 | 0.10 | 0.03 |
| $Fe_2O_3$ | 0.148 | 0.195 | 0.195 | 0.146 | 0.151 | 0.23 | 0.148 |
| $As_2O_3$ | 0.16 | 0.17 | 0.16 | 0.16 | 0.17 | 0.16 | 0.21 |
| $Na_2O(N)$ | 0.5 | 0.5 | 0.5 | 0.5 | 0.5 | 0.5 | 1.5 |
| x | 0.3071 | 0.3086 | 0.3097 | 0.3080 | 0.3077 | 0.3106 | 0.3082 |
| y | 0.3185 | 0.3202 | 0.3213 | 0.3191 | 0.3189 | 0.3230 | 0.3190 |
| Y (%) | 81.00 | 81.16 | 79.52 | 80.49 | 80.18 | 78.99 | 81.73 |
| ΔY (%) | 1.5 | 1.15 | 1.18 | 1.50 | 1.62 | 1.43 | 1.03 |

| | 8 | 9 | 10 | 11 | 12 | 13 | 14 |
|---|---|---|---|---|---|---|---|
| $SiO_2$ | (72.12) | (71.81) | (71.62) | (71.38) | (71.35) | (71.60) | (72.50) |
| $B_2O_3$ | (2.00) | (2.00) | (2.00) | (2.00) | (2.00) | (2.00) | (2.00) |
| $Al_2O_3$ | 8.50 | 8.46 | 8.66 | 8.26 | 8.41 | 8.35 | 8.34 |
| $Na_2O$ | 11.10 | 11.24 | 11.16 | 11.23 | 11.25 | 11.10 | 11.05 |
| CaO | 0.75 | 0.75 | 0.75 | 0.76 | 0.79 | 0.78 | 0.77 |
| BaO | 2.12 | 2.11 | 2.18 | 2.25 | 2.17 | 2.18 | 2.21 |
| F | 4.83 | 5.06 | 4.96 | 4.85 | 5.13 | 4.98 | 4.78 |
| $TiO_2$ | 0.49 | 0.53 | 0.52 | 0.51 | 0.98 | 0.94 | 0.02 |
| $CeO_2$ | — | — | 0.08 | 0.20 | — | 0.07 | 0.19 |
| $Fe_2O_3$ | 0.127 | 0.166 | 0.154 | 0.147 | 0.075 | 0.100 | 0.149 |
| $As_2O_3$ | — | — | — | — | — | — | — |
| $Na_2O(N)$ | 0.5 | 0.5 | 0.5 | 0.5 | 0.5 | 0.5 | 1.5 |
| x | 0.3072 | 0.3083 | 0.3092 | 0.3082 | 0.3073 | 0.3063 | 0.3102 |
| y | 0.3193 | 0.3210 | 0.3203 | 0.3190 | 0.3185 | 0.3175 | 0.3202 |
| Y (%) | 79.45 | 78.33 | 80.89 | 81.00 | 79.69 | 77.37 | 81.82 |
| ΔY (%) | 1.07 | 0.93 | 1.16 | 1.70 | 1.48 | 1.70 | 0.83 |

We claim:

1. A sodium fluoride opal glass composition exhibiting a creamy-white tint consisting essentially, in weight percent on the oxide basis, of

| | | | |
|---|---|---|---|
| $SiO_2$ | 70–73 | BaO | 1–3 |
| $Na_2O$ | 10.5–13 | $Fe_2O_3$ | 0.05–0.30 |
| F | 4–5.5 | $TiO_2$ | 0.1–1 |
| CaO | 0.2–1.7 | $As_2O_3$ | 0–0.5 |
| $Al_2O_3$ | 6–9 | $CeO_2$ | 0–0.5. |

2. A composition according to claim 1 characterized in that said F, $Fe_2O_3$, $As_2O_3$, $TiO_2$, and $CeO_2$ consist essentially of

| | | | |
|---|---|---|---|
| F | 4.2–5.2 | $As_2O_3$ | 0.05–0.4 |
| $Fe_2O_3$ | 0.1–0.25 | $CeO_2$ | no more than 0.2. |
| $TiO_2$ | 0.1–0.7 | | |

3. A composition according to claim 1 characterized in that said composition also contains 0.5–3% $B_2O_3$.

4. A composition according to claim 2 characterized in that said composition also contains 0.5–3% $B_2O_3$.

5. A composition according to claim 1 characterized in that said composition also contains up to 1.5% ZnO.

6. A composition according to claim 2 characterized in that said composition also contains up to 1.5% ZnO.

7. A composition according to claim 1 characterized in that said composition is essentially free of $Li_2O$ and $K_2O$.

* * * * *